United States Patent
Wang

(10) Patent No.: US 9,203,308 B2
(45) Date of Patent: Dec. 1, 2015

(54) POWER CONVERTER AND OPERATING METHOD THEREOF

(71) Applicant: uPI Semiconductor Corporation, Zhubei, Hsinchu County (TW)

(72) Inventor: Han Pang Wang, Zhubei (TW)

(73) Assignee: UPI SEMICONDUCTOR CORPORATION, Zhubei, Hsinchu County (TW)

( * ) Notice: Subject to any disclaimer, the term of this patent is extended or adjusted under 35 U.S.C. 154(b) by 339 days.

(21) Appl. No.: 13/798,386

(22) Filed: Mar. 13, 2013

(65) Prior Publication Data

US 2013/0257394 A1    Oct. 3, 2013

(30) Foreign Application Priority Data

Mar. 30, 2012    (TW) ............... 101111482 A

(51) Int. Cl.
  *G05F 1/56*      (2006.01)
  *H02M 3/158*     (2006.01)
  *G05F 1/565*     (2006.01)

(52) U.S. Cl.
  CPC ............ *H02M 3/158* (2013.01); *H02M 3/1584* (2013.01); *G05F 1/565* (2013.01)

(58) Field of Classification Search
  CPC ..................... G05F 1/10; G05F 1/56
  USPC .................. 323/268, 271, 272, 282–285, 288
  See application file for complete search history.

(56) References Cited

U.S. PATENT DOCUMENTS

| | | | |
|---|---|---|---|
| 6,696,825 B2 | 2/2004 | Harris et al. | |
| 7,453,250 B2 | 11/2008 | Qiu et al. | |
| 7,696,734 B2 | 4/2010 | Endo et al. | |
| 7,923,977 B2 | 4/2011 | Huang | |
| 8,058,932 B2 * | 11/2011 | Liu et al. | ........................ 331/16 |
| 8,106,634 B2 * | 1/2012 | Hojo et al. | ..................... 323/222 |
| 2010/0033154 A1 | 2/2010 | Cheng et al. | |
| 2010/0141225 A1 * | 6/2010 | Isham et al. | .................. 323/282 |
| 2011/0031948 A1 | 2/2011 | Chien et al. | |
| 2011/0215737 A1 * | 9/2011 | Poirier | .......................... 315/297 |

FOREIGN PATENT DOCUMENTS

| | | |
|---|---|---|
| CN | 101227141 A | 1/2011 |
| TW | I301701 | 10/2008 |
| TW | 200925818 | 6/2009 |

OTHER PUBLICATIONS

English translation of abstract of TW I301701 (published Oct. 1, 2008).
English translation of abstract of TW 200925818 (published Jun. 16, 2009).
Taiwan Office Action dated Apr. 7, 2014.
China Office Action dated Jan. 29, 2015.

* cited by examiner

*Primary Examiner* — Matthew Nguyen
(74) *Attorney, Agent, or Firm* — McClure, Qualey & Rodack, LLP

(57) ABSTRACT

A power converter includes a ramp generating unit, a first comparator, a second comparator, and a pulse width modulation (PWM) signal generating unit. The ramp generating unit provides a ramp signal. The first comparator receives the ramp signal and a control signal to provide a normal operation control signal. The second comparator receives the ramp signal and the control signal to provide a dynamic response control signal. The PWM signal generating unit generates a PWM signal according to the normal operation control signal or dynamic response control signal. When the control signal is higher than a threshold of ramp signal, the second comparator provides the dynamic response control signal to the PWM signal generating unit to control it to adjust a duty cycle of the PWM signal.

13 Claims, 10 Drawing Sheets

POWER CONVERTER AND OPERATING METHOD THEREOF

BACKGROUND OF THE INVENTION

1. Field of the Invention

The invention relates to a DC-DC converter; in particular, to a power converter having an improved transient response and an operating method thereof 2. Description of the Prior Art In recent years, power supply circuits have been widely used in different electronic products, such as portable electronic products, or computer products. The power supply circuit can provide voltage or current conversion or provide power of fixed voltage or current for the electronic products to operate. In the power supply circuits, a power integrated circuit is one of the necessary active components.

U.S. Pat. No. 6,696,825 discloses a DC-DC converter having a feature of forming an adjustable voltage range between a first voltage higher than the output voltage and a second voltage lower than the output voltage and detecting instant changes of the output voltage by a comparator circuit to generate corresponding change of pulse modulation width to drive the transistor to change the output current and the output voltage. Please refer to FIG. 1. FIG. 1 shows the circuit structure of the DC-DC converter.

As shown in FIG. 1, in order to have the function of generating real-time dynamic reaction to outer voltage changes, the DC-DC converter 20 in U.S. Pat. No. 6,696,825 needs an additional pin P to direct the output voltage $V_{out}$ into the IC 55, and uses a specific detection circuit in the IC 55 to detect and analyze the output voltage $V_{out}$, then the DC-DC converter 20 determines the change of the pulse modulation width and takes appropriate response measure to achieve the aim of real-time dynamic reaction. However, the area and cost of the IC will be increased due to the disposing of additional pin P and specific detection circuit.

Therefore, the invention provides a power converter and an operating method thereof to solve the above-mentioned problems occurred in the prior arts.

SUMMARY OF THE INVENTION

A scope of the invention is to provide a power converter. In a preferred embodiment, the power converter includes a ramp generating unit, a first comparator, a second comparator, and a pulse width modulation (PWM) signal generating unit. The first comparator is coupled to the ramp generating unit. The second comparator is coupled to the ramp generating unit. The PWM signal generating unit is coupled to the first comparator and the second comparator.

The ramp generating unit is used for providing a ramp signal. The first comparator is used for receiving the ramp signal and a control signal to provide a normal operation control signal, wherein the control signal is related to an output voltage of the power converter and a reference voltage. The second comparator is used for receiving the ramp signal and the control signal to provide a dynamic response control signal. The PWM signal generating unit is used for generating a PWM signal according to the normal operation control signal or the dynamic response control signal. When the control signal is higher than a threshold of the ramp signal, the second comparator provides the dynamic response control signal to the PWM signal generating unit to control the PWM signal generating unit to adjust a duty cycle of the PWM signal.

In an embodiment, the PWM signal generating unit includes a PWM signal generator, the PWM signal generator is coupled to the first comparator and used for generating an initial PWM signal, and a duty cycle of the initial PWM signal is dynamically changed with an output load of the power converter.

In an embodiment, the power converter includes an error amplifier and a compensating unit, the error amplifier is used for providing the control signal, and the compensating unit is coupled to an output terminal of the error amplifier.

In an embodiment, when the power converter is a single-phase DC-DC converter, the PWM signal generating unit includes a logic unit and a PWM signal generator, the PWM signal generator is used for generating an initial PWM signal, and the logic unit receives the initial PWM signal and the dynamic response control signal and generates the PWM signal.

In an embodiment, when the power converter is a multi-phase DC-DC converter, the PWM signal generating unit includes a PWM signal generator and a phase channel selection unit, the PWM signal generator is used for generating an initial PWM signal, and the phase channel selection unit receives the initial PWM signal and the dynamic response control signal and provides the PWM signal to a multi-phase channel, wherein a duty cycle of the PWM signal of each phase is dynamically changed with the initial PWM signal and the dynamic response control signal.

A scope of the invention is to provide an operating method for a power converter. The method includes steps of: (a) providing a ramp signal; (b) providing a normal operation control signal according to the ramp signal and a control signal, wherein the control signal is related to an output voltage of the power converter and a reference voltage; (c) determining whether the control signal is higher than a threshold of the ramp signal; (d) when the determining result of step (c) is yes, providing a dynamic response control signal; (e) adjusting a duty cycle of a PWM signal according to the dynamic response control signal, wherein the PWM signal is generated according to the normal operation control signal or the dynamic response control signal.

Compared to the prior arts, the power converter and operating method thereof disclosed in the invention can determine the change of the pulse modulation width and take appropriate response measure according different output voltages without additional pins and specific detection circuit; therefore, it can have advantages of real-time dynamic response, reducing area and cost of IC. In addition, the simple circuit used in the power converter of the invention can enhance the reliability of IC and the error detection and correction, and it can have higher versatility to be applied to all single-phase converters and multi-phase converters.

The advantage and spirit of the invention may be understood by the following detailed descriptions together with the appended drawings.

DETAILED DESCRIPTION OF THE INVENTION

A preferred embodiment of the invention is a power converter. In fact, the power converter of the invention is applied in a power IC, but not limited to this. The invention can be applied in power conversion circuit structures of the AC-DC converter or the DC-AC converter.

Figure 1:
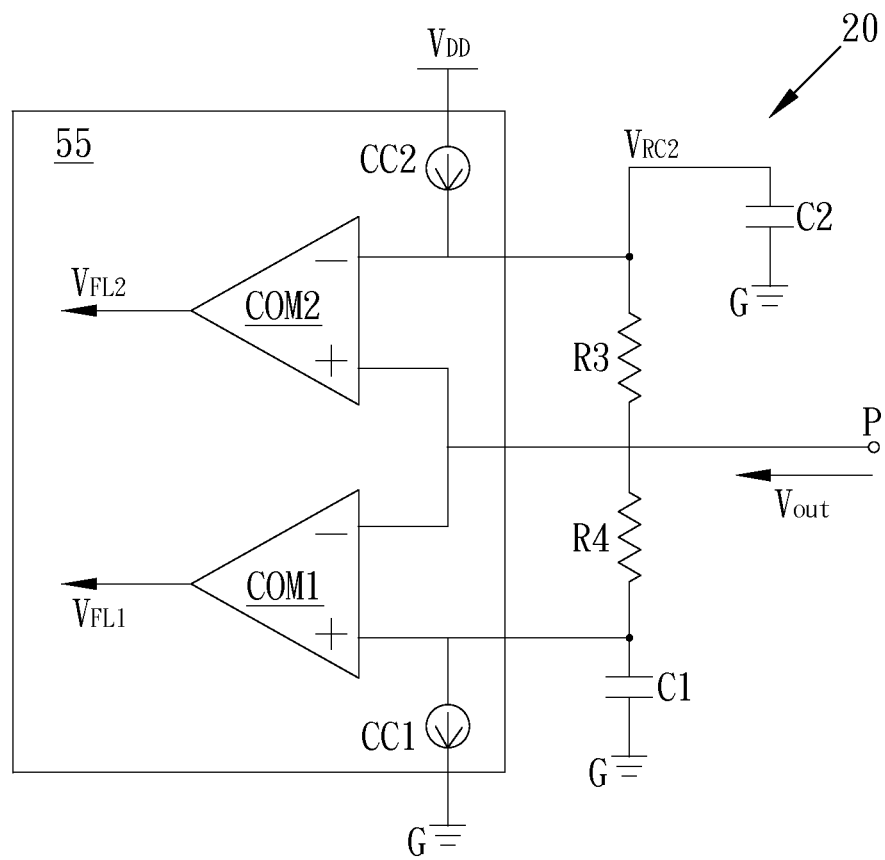
FIG. 1 illustrates a schematic diagram of a circuit structure of a conventional power converter.
Figure 2A:
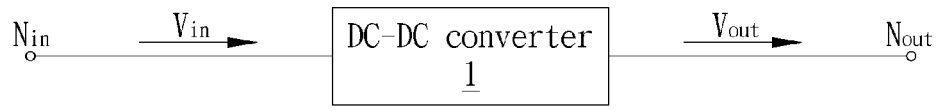
FIG. 2A and FIG. 2B illustrate schematic diagrams of a circuit structure of a power converter in an embodiment of the invention.
Figure 2B:
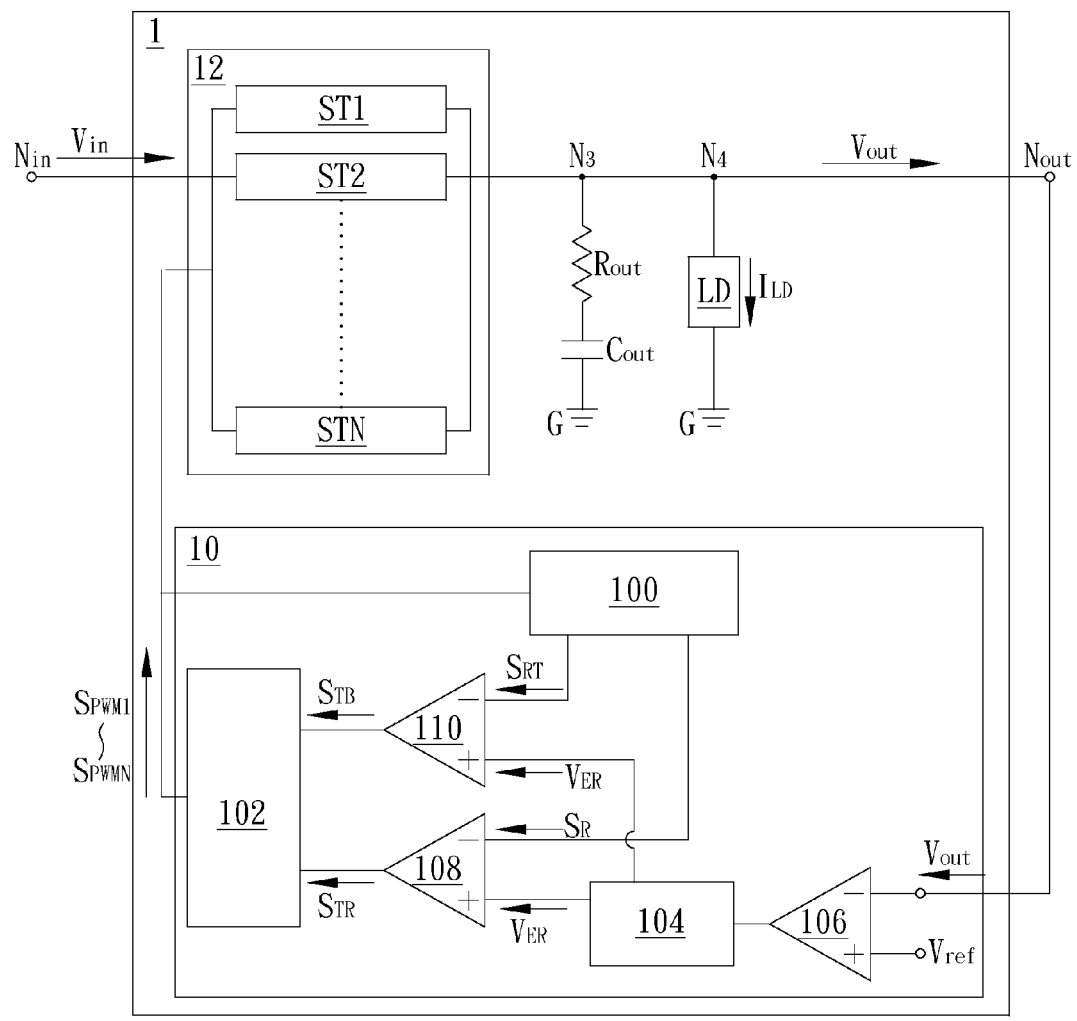

Please refer to FIG. 2A and FIG. 2B. FIG. 2A and FIG. 2B illustrate schematic diagrams of a circuit structure of a power converter in the invention. As shown in FIG. 2A, the DC-DC converter 1 is used to convert the input voltage $V_{in}$ received by the voltage input terminal $N_{in}$ into the output voltage $V_{out}$ and the output voltage $V_{out}$ is outputted from the voltage output terminal $N_{out}$.

As shown in FIG. 2B, the DC-DC converter 1 includes a pulse width modulation (PWM) controller 10, a multi-phase channel 12, an output resistor $R_{out}$, an output capacitor $C_{out}$, and a load LD. The PWM controller 10 includes a ramp generating unit 100, a PWM signal generating unit 102, a compensating unit 104, an amplifying unit 106, a first comparator 108, and a second comparator 110. The multi-phase channel 12 includes N channels ST1~STN aligned in parallel. The output capacitor $C_{out}$ has lower equivalent capacitance resistance, and the output resistor $R_{out}$ is the equivalent series resistance (ESR) of the output capacitor $C_{out}$. A load current $I_{LD}$ is the current flowing through the load LD.

In this embodiment, the ramp generating unit 100 can be replaced by a triangle wave generating unit or a sawtooth wave generating unit. The amplifying unit 106 can be an error amplifier or a transconductance amplifier or other equivalent circuits.

The PWM controller 10 is coupled to the multi-phase channel 12 and the voltage output terminal $N_{out}$. The multi-phase channel 12 is coupled between the voltage input terminal $N_{in}$ and the voltage output terminal $N_{out}$. The output resistor $R_{out}$ and the output capacitor $C_{out}$ are coupled in series between the third node N3 and the ground G, and the third node N3 is between the multi-phase channel 12 and the voltage output terminal $N_{out}$. The load LD is coupled between the fourth node N4 and the ground G, and the fourth node N4 is between the multi-phase channel 12 and the voltage output terminal $N_{out}$. The ramp generating unit 100 is coupled to the first comparator 108, the second comparator 110, and the N channels ST1~STN of the multi-phase channel 12. The PWM signal generating unit 102 is coupled to the first comparator 108, the second comparator 110, and the N channels ST1~STN of the multi-phase channel 12. The compensating unit 104 is coupled to the amplifying unit 106, the first comparator 108, and the second comparator 110. The amplifying unit 106 is coupled to the reference voltage $V_{ref}$, the voltage output terminal $N_{out}$, and the voltage output terminal $N_{out}$. The first comparator 108 is coupled to the ramp generating unit 100, the compensating unit 104, and the PWM signal generating unit 102. The second comparator 110 is coupled to the ramp generating unit 100, the compensating unit 104, and the PWM signal generating unit 102.

In the PWM controller 10, the first input terminal and the second input terminal of the amplifying unit 106 receive the reference voltage $V_{ref}$ and the output voltage $V_{out}$ from the voltage output terminal $N_{out}$ respectively, and the amplifying unit 106 generates a control signal $V_{ref}$ according to the voltage difference between the reference voltage $V_{ref}$ and the output voltage $V_{out}$. That is to say, the control signal $V_{ER}$ outputted by the amplifying unit 106 relates to the output voltage $V_{out}$ of the DC-DC converter 1 and the reference voltage $V_{ref}$. In this embodiment, the output voltage $V_{out}$ can be also an output feedback voltage or a feedback voltage ($V_{FB}$).

The control signal $V_{ER}$ generated by the amplifying unit 106 is compensated by the compensating unit 104 and then outputted to the first input terminal of the first comparator 108 and the first input terminal of the second comparator 110. The ramp generating unit 100 is used to generate the ramp signal. In this embodiment, the ramp signal generated by the ramp generating unit 100 is $S_R$ or a ramp top signal $S_{RT}$ having a (top) threshold value. The ramp signal $S_R$ generated by the ramp generating unit 100 is outputted to the second input terminal of the first comparator 108, and the ramp top signal $S_{RT}$ generated by the ramp generating unit 100 is outputted to the second input terminal of the second comparator 110.

When the first input terminal and the second input terminal of the first comparator 108 receive the control signal $V_{ER}$ outputted by the amplifying unit 106 and the ramp signal $S_R$ generated by the ramp generating unit 100 respectively, the first comparator 108 determines whether the magnitude of the control signal $V_{ER}$ is higher than the ramp signal $S_R$. If the determining result of the first comparator 108 is yes, the first comparator 108 will output a normal operation control signal (a trigger signal) $S_{TR}$ to the PWM signal generating unit 102. When the PWM signal generating unit 102 receives the normal operation control signal $S_{TR}$, the PWM signal generating unit 102 generates a PWM signal according to the normal operation control signal $S_{TR}$.

When the first input terminal and the second input terminal of the second comparator 110 receive the control signal $V_{ER}$ outputted by the amplifying unit 106 and the ramp top signal $S_{RT}$ having the (top) threshold value generated by the ramp generating unit 100 respectively, the second comparator 110 determines whether the magnitude of the control signal $V_{ER}$ is higher than the (top) threshold value of the ramp top signal $S_{RT}$. If the determining result of the second comparator 110 is yes, the second comparator 110 will output a dynamic response control signal $S_{TB}$ to the PWM signal generating unit 102. When the PWM signal generating unit 102 receives the dynamic response control signal $S_{TB}$, the PWM signal generating unit 102 will adjust the duty cycle of the PWM signal according to the dynamic response control signal $S_{TB}$, so that at some time points, the angle between the control signal $V_{ER}$ and the ramp signal $S_R$ will be larger to reduce the interference of noise to enhance its signal-to-noise ratio (SNR).

It should be noticed that the PWM signal generating unit 102 actually generates PWM signals $S_{PWM1} \sim S_{PWMN}$ according to the normal operation control signal $S_{TR}$, the dynamic response control signal $S_{TB}$, the input voltage $V_{in}$, and the output voltage $V_{out}$. The PWM signal generating unit 102 correspondingly outputs the PWM signals $S_{PWM1} \sim S_{PWMN}$ to the channels ST1~STN of the multi-phase channel 12 respectively. The ramp generating unit 100 can generate the ramp signal $S_R$ according to the PWM signals $S_{PWM1} \sim S_{PWMN}$, the input voltage $V_{in}$, and the output voltage $V_{out}$. In other embodiments, the ramp generating unit 100 can generate the ramp signal $S_R$ without coupling to the input voltage and the output voltage.

Figure 3:
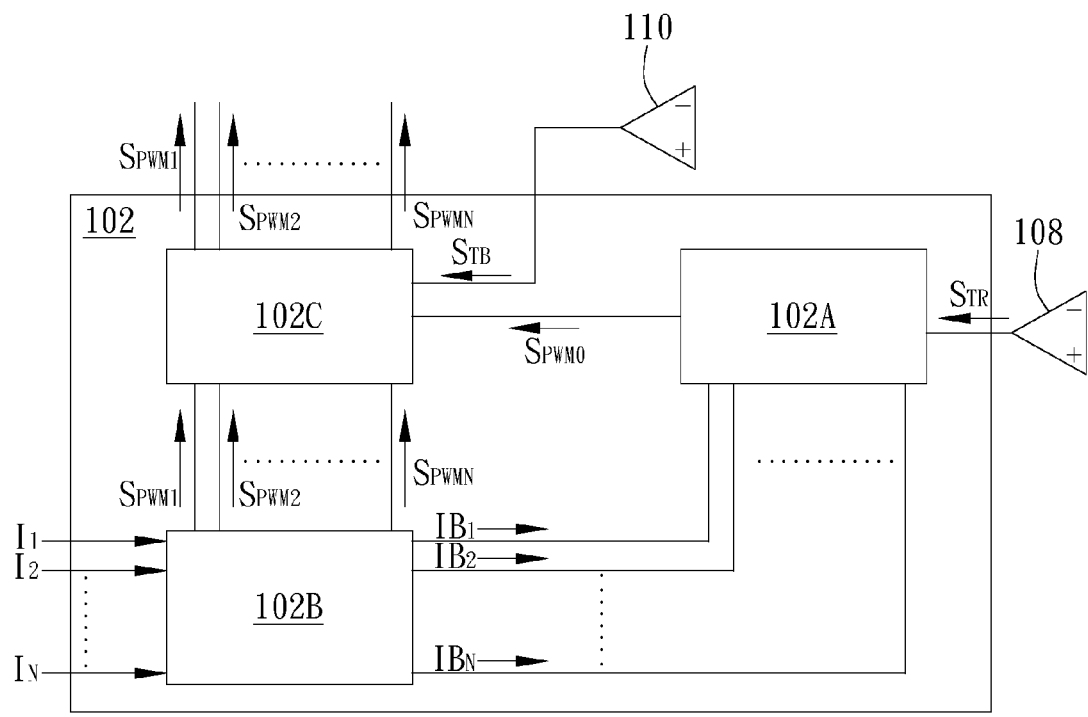
FIG. 3 illustrates a detailed functional block diagram of the PWM signal generating unit 102 in FIG. 2B.

Next, please refer to FIG. 3. FIG. 3 illustrates a detailed functional block diagram of the PWM signal generating unit 102 in FIG. 2B. It should be noticed that FIG. 3 is used for the multi-phase DC-DC converter, and it is only an embodiment of the PWM signal generating unit 102 of the invention, but not limited to this. As shown in FIG. 3, the PWM signal generating unit 102 includes a PWM signal generator 102A, a phase channel current sensing unit 102B, and a phase channel selection unit 102C.

The PWM signal generator 102A is coupled to the first comparator 108, the phase channel current sensing unit 102B, and the phase channel selection unit 102C. The phase channel current sensing unit 102B is coupled to the PWM signal generator 102A, the phase channel selection unit 102C, the inductances L1~LN in the channels ST1~STN of the multi-phase channel 12. (See FIG. 4) The phase channel selection unit 102C is coupled to the PWM signal generator 102A, the phase channel current sensing unit 102B, and the channels ST1~STN of the multi-phase channel 12.

In this embodiment, the PWM signal generator 102A is used to generate an initial PWM signal $S_{PWM0}$; the phase channel current sensing unit 102B is used to sense inductance currents $I_1 \sim I_N$ flowing through the inductances L1~LN in the channels ST1~STN of the multi-phase channel 12, and calculate them to obtain error currents $IB_1 \sim IB_N$ among the channels ST1~STN, and direct the error currents $IB_1 \sim IB_N$ into the PWM signal generator 102A for the PWM signal generator 102A to adjust its duty cycle of generating the initial PWM signal $S_{PWM0}$. The phase channel selection unit 102C receives the initial PWM signal $S_{PWM0}$ from the PWM signal generator 102A and the dynamic response control signal $S_{TB}$ from the second comparator 110 and provides the PWM signals $S_{PWM1} \sim S_{PWMN}$ to the channels ST1~STN of the multi-phase channel 12.

Figure 4:
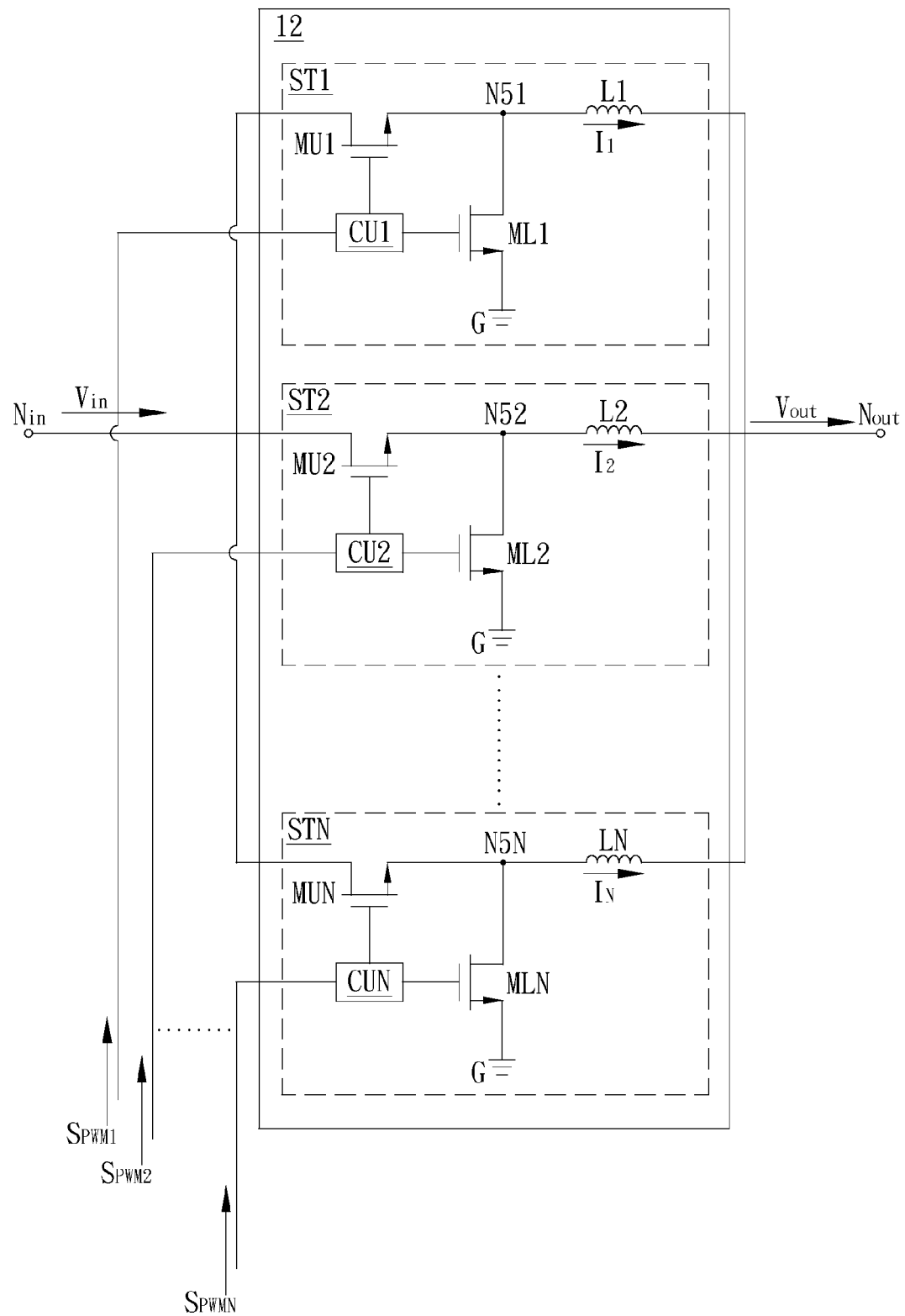
FIG. 4 illustrates a detailed functional block diagram of the phase channels ST1~STN of the multi-phase channel 12 in FIG. 2B.

Please refer to FIG. 4. FIG. 4 illustrates a detailed functional block diagram of the phase channels ST1~STN of the multi-phase channel 12 in FIG. 2B. It should be noticed that FIG. 4 is only an embodiment of the channels ST1~STN of the multi-phase channel 12 in this invention, but not limited to this. As shown in FIG. 4, the channels ST1~STN of the multi-phase channel 12 are all coupled between the voltage input terminal $N_{in}$ and the voltage output terminal $N_{out}$, and the channels ST1~STN are coupled to the phase channel selection unit 102C to receive the PWM signals $S_{PWM1} \sim S_{PWMN}$ respectively. The duty cycles of the PWM signals $S_{PWM1} \sim S_{PWMN}$ of each of the channels ST1~STN is dynamically varied with the initial PWM signal $S_{PWM0}$ and the dynamic response control signal $S_{TB}$, but not limited to this.

In practical applications, the duty cycle of the initial PWM signal $S_{PWM0}$ generated by the PWM signal generator 102A is dynamically varied with the output load LD of the DC-DC converter 1. That is to say, under the condition of weightier output load LD, the duty cycle of the initial PWM signal $S_{PWM0}$ will become larger, and the distribution of the initial PWM signal $S_{PWM0}$ will also become denser. When transient is occurred, the second comparator 110 outputs the dynamic response control signal $S_{TB}$ to the PWM signal generating unit 102. Because the PWM signal generating unit 102 generates the PWM signals $S_{PWM1} \sim S_{PWMN}$ of each of the channels ST1~STN according to the initial PWM signal $S_{PWM0}$ and the dynamic response control signal $S_{TB}$, the distribution of the PWM signals $S_{PWM1} \sim S_{PWMN}$ of each of the channels ST1~STN will also become denser and the output of each of the channels ST1~STN will also become larger. Therefore, the output current will become larger and the output voltage can be drawn back to the default adjustment value to improve the transient response of the DC-DC converter 1.

The first channel ST1 of the multi-phase channel 12 includes a control unit CU1, a first switch MU1, a second switch ML1, and an inductance L1. The control unit CU1 is coupled to the phase channel selection unit 102C, the first switch MU1, and the second switch ML1 of the PWM signal generating unit 102. The first switch MU1 and the inductance L1 are connected in series between the voltage input terminal $N_{in}$, and the voltage output terminal $N_{out}$. The second switch ML1 is coupled between the fifth node N51 and the ground G, and the fifth node N51 is located between the first switch MU1 and the inductance L1.

Similarly, the second channel ST2 of the multi-phase channel 12 includes a control unit CU2, a first switch MU2, a second switch ML2, and an inductance L2. The control unit CU2 is coupled to the phase channel selection unit 102C of the PWM signal generating unit 102, the first switch MU2, and the second switch ML2. The first switch MU2 and the inductance L2 are connected in series between the voltage input terminal $N_{in}$ and the voltage output terminal $N_{out}$. The second switch ML2 is coupled between the fifth node N52 and the ground G, and the fifth node N52 is located between the first switch MU2 and the inductance L2. And so on, this is not otherwise repeated.

It should be noticed that the first switches MU1~MUN and the second switches ML1~MLN of the channels ST1~STN of the multi-phase channel 12 can be all N-type transistors, all P-type transistors, or combination of N-type transistors and P-type transistors. There is no specific limitation. When the control units CU1~CUN of the channels ST1~STN of the multi-phase channel 12 receive the PWM signals $S_{PWM1} \sim S_{PWMN}$ from the PWM signal generating unit 102 respectively, the control units CU1~CUN of the channels ST1~STN will control their own first switches MU1~MUN and second switches ML1~MLN to be conductive or shut down according to the PWM signals $S_{PWM1} \sim S_{PWMN}$ respectively.

Figure 5:
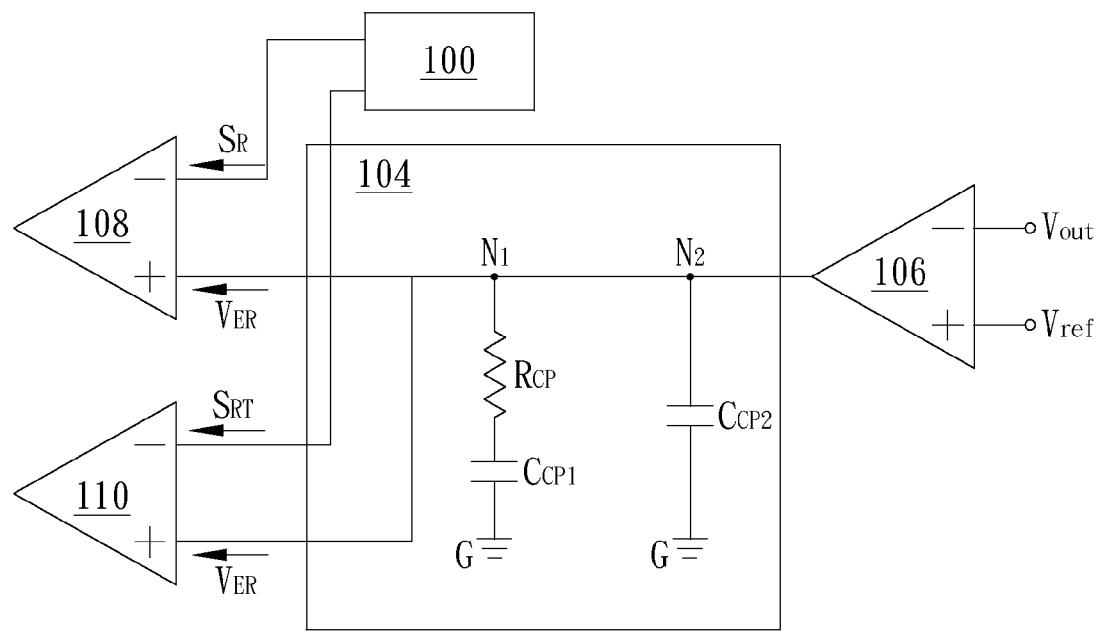
FIG. 5 illustrates a detailed functional block diagram of the compensating unit 104 in FIG. 2B.

Please refer to FIG. 5. FIG. 5 illustrates a detailed functional block diagram of the compensating unit 104 in FIG. 2B. It should be noticed that FIG. 5 is only an embodiment of the compensating unit 104 of the invention, but not limited to this. As shown in FIG. 5, the compensating unit 104 includes a compensating resister $R_{CP}$, first compensating capacitor $C_{CP1}$, and a second compensating capacitor $C_{CP2}$. The compensating resister $R_{CP}$ and the first compensating capacitor $C_{CP1}$ are connected in series between the first node $N_1$ and the ground G. The second compensating capacitor $C_{CP2}$ is coupled between the second node $N_2$ and the ground G. The first node $N_1$ and the second node $N_2$ are both located between the amplifying unit 106 and the first comparator 108.

Figure 6A:
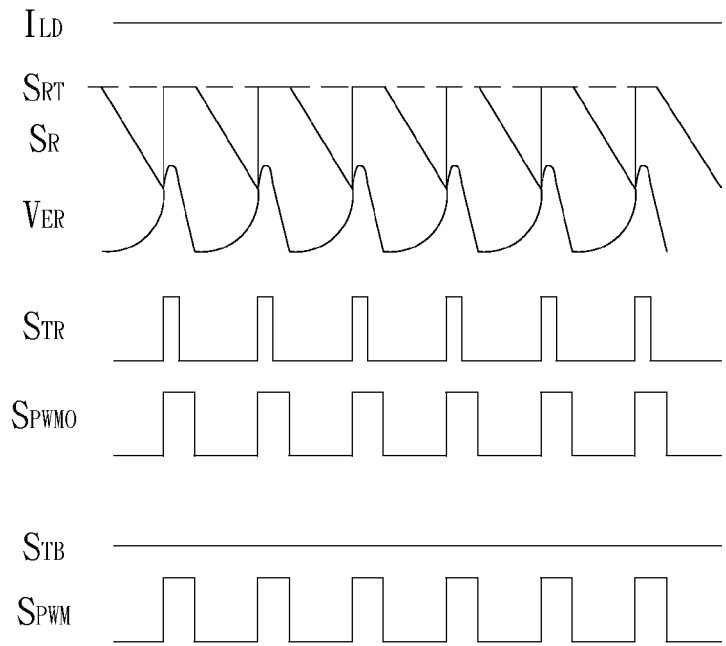
FIG. 6A illustrates a wave form diagram of the signals of the single-phase DC-DC converter under the condition of low loading current $I_{LD}$.
Figure 6B:
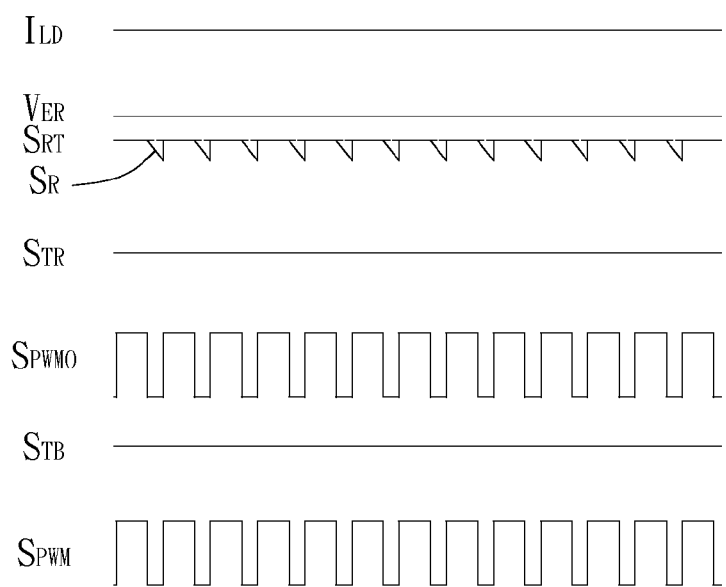
FIG. 6B illustrates a wave form diagram of the signals of the single-phase DC-DC converter under the condition of high loading current $I_{LD}$.
Figure 6C:
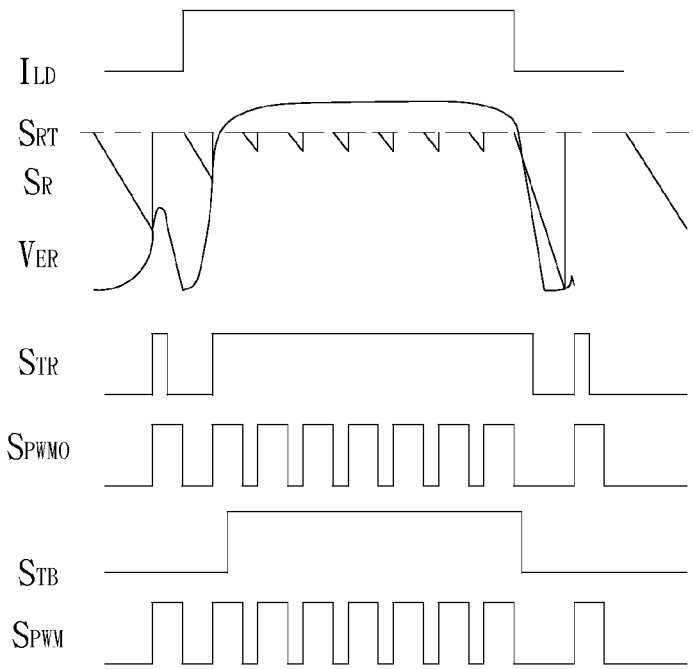
FIG. 6C illustrates a wave form diagram of the signals of the single-phase DC-DC converter under the condition of changing high and low loading current $I_{LD}$.

In an embodiment, it is assumed that the DC-DC converter 1 in FIG. 2A is a single-phase DC-DC converter; that is to say, the output stage of the DC-DC converter only includes one channel. At this time, the PWM signal generating unit 102 of the DC-DC converter 1 includes the PWM signal generator 102A and a logic unit (not shown). The PWM signal generator 102A generates the initial PWM signal $S_{PWM0}$; the logic unit receives the initial PWM signal $S_{PWM0}$ and the dynamic response control signal $S_{TB}$ and generates the PWM signal $S_{PWM0}$ to the single-phase channel. Please refer to FIG. 6A~FIG. 6C. FIG. 6A illustrates a wave form diagram of the signals of the single-phase DC-DC converter 1 under the condition of low loading current $I_{LD}$; FIG. 6B illustrates a wave form diagram of the signals of the single-phase DC-DC converter 1 under the condition of high loading current $I_{LD}$; FIG. 6C illustrates a wave form diagram of the signals of the single-phase DC-DC converter 1 under the condition of changing high and low loading current $I_{LD}$.

From FIG. 6A~FIG. 6C, it can be known that no matter the single-phase DC-DC converter 1 is operated under the condition of high loading current, low loading current, or changing high and low loading current, after the amplifying unit 106 is used to generate the control signal $V_{ER}$, the single-phase DC-DC converter 1 compares the control signal $V_{ER}$ with the ramp signal $S_R$ and the ramp top signal $S_{RT}$ respectively, and then uses the dynamic response control signal $S_{TB}$ and the initial PWM signal $S_{PWM0}$ to adjust the duty cycle of the PWM signal $S_{PWM}$ according to the compared result. Therefore, at some time points, the angle between the control signal $V_{ER}$ and the ramp signal $S_R$ becomes larger to effectively avoid the interference of noise and increase the signal-to-noise ratio (SNR).

Figure 7A:
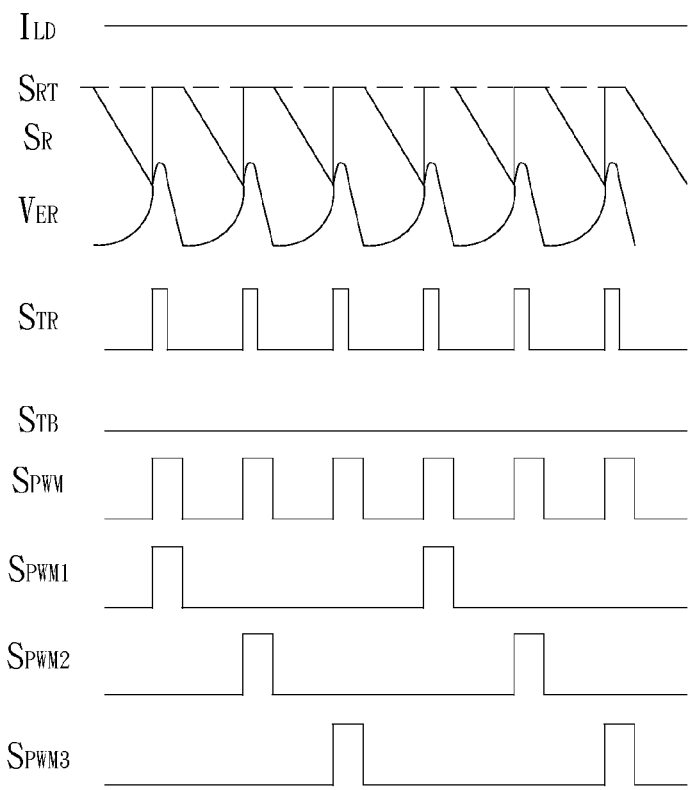
FIG. 7A illustrates a wave form diagram of the signals of the three-phase DC-DC converter under the condition of low loading current $I_{LD}$.
Figure 7B:
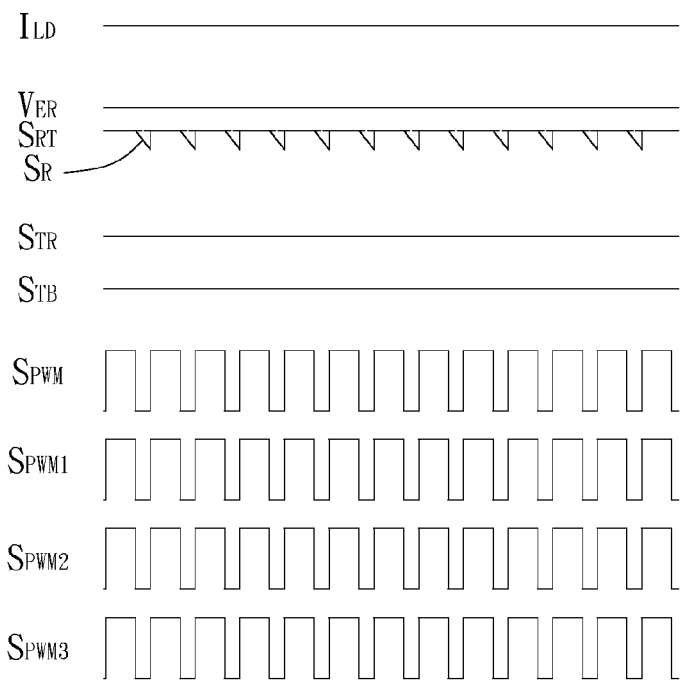
FIG. 7B illustrates a wave form diagram of the signals of the three-phase DC-DC converter under the condition of high loading current $I_{LD}$.
Figure 7C:
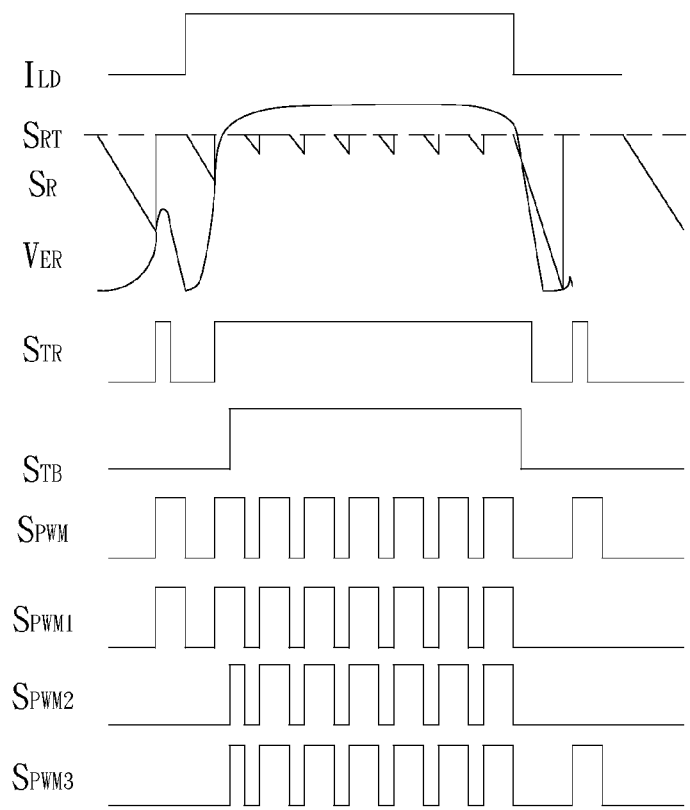
FIG. 7C illustrates a wave form diagram of the signals of the three-phase DC-DC converter under the condition of changing high and low loading current $I_{LD}$.

In another embodiment, it is assumed that the DC-DC converter 1 in FIG. 2A is a multi-phase DC-DC converter shown in FIG. 2B; that is to say, the output stage 12 of the DC-DC converter 1 includes N channels ST1~STN. Please refer to FIG. 7A~FIG. 7C. It is assumed that N=3, namely the output stage 12 of the DC-DC converter 1 includes 3 channels ST1~ST3. FIG. 7A illustrates a wave form diagram of the signals of the three-phase DC-DC converter 1 under the condition of low loading current $I_{LD}$; FIG. 7B illustrates a wave form diagram of the signals of the three-phase DC-DC converter 1 under the condition of high loading current $I_{LD}$; FIG. 7C illustrates a wave form diagram of the signals of the three-phase DC-DC converter 1 under the condition of changing high and low loading current $I_{LD}$.

From FIG. 7A~FIG. 7C, it can be known that no matter the three-phase DC-DC converter 1 is operated under the condition of high loading current, low loading current, or changing high and low loading current, after the amplifying unit 106 is used to generate the control signal $V_{ER}$, the three-phase DC-DC converter 1 compares the control signal $V_{ER}$ with the ramp signal $S_R$ and the ramp top signal $S_{RT}$ respectively, and then uses the dynamic response control signal $S_{TB}$ and the initial PWM signal $S_{PWM0}$ cooperated with the phase channel selection unit 102C to adjust and select the duty cycle of the PWM signal $S_{PWM}$ according to the compared result. Therefore, at some time points, the angle between the control signal $V_{ER}$ and the ramp signal $S_R$ becomes larger to effectively avoid the interference of noise and increase the signal-to-noise ratio (SNR).

Another embodiment of the invention is a power converter operating method. In this embodiment, the power converter operating method is used in a power IC to operate a power converter. The power converter is coupled to a voltage output terminal and a multi-phase channel. The multi-phase channel is coupled between a voltage input terminal and the voltage output terminal The multi-phase channel includes a plurality of parallel phase channels. A plurality of input terminals and output terminals of the plurality of phase channels are coupled to the voltage input terminal and the voltage output terminal respectively.

Figure 8:
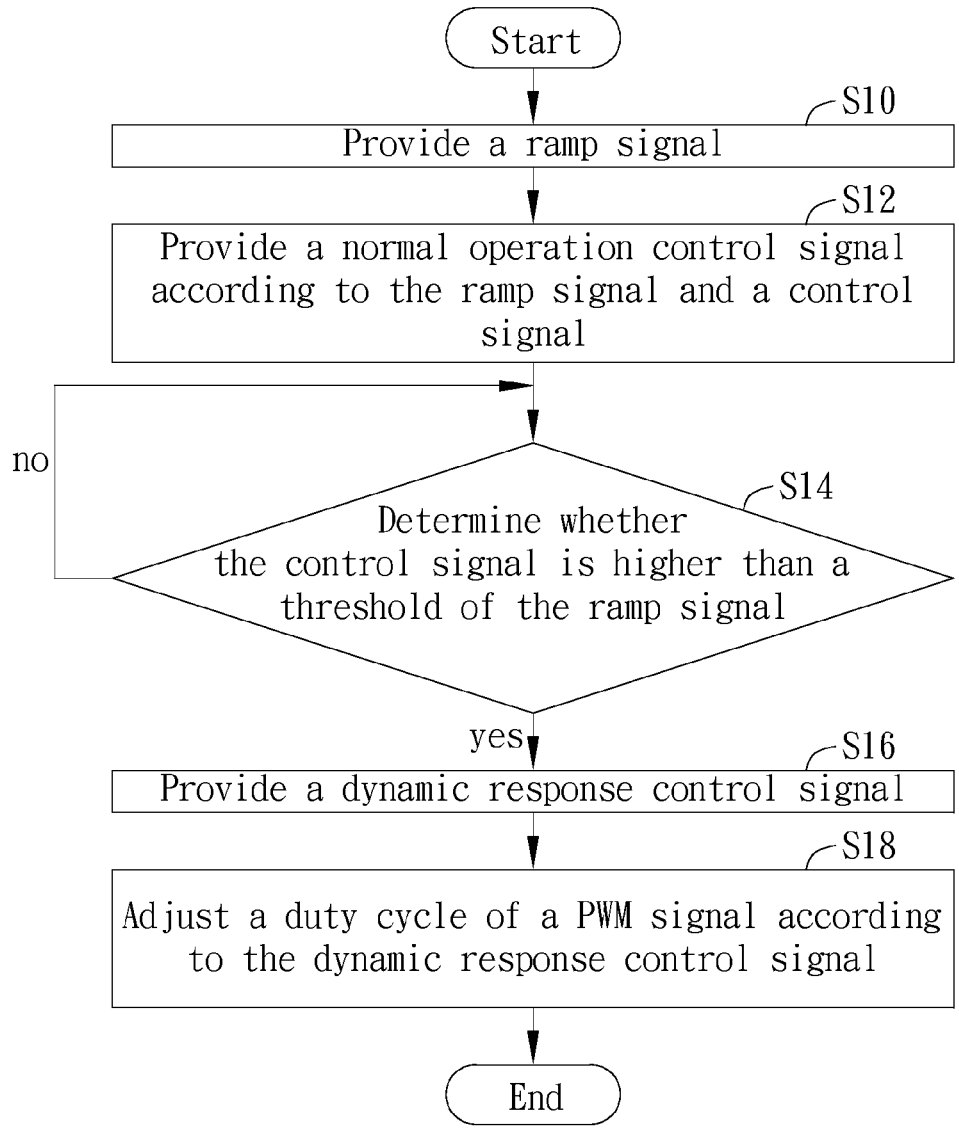
FIG. 8 illustrates a flowchart of the operating method for the power converter in another embodiment of the invention.

Please refer to FIG. 8. FIG. 8 illustrates a flowchart of the power converter operating method. As shown in FIG. 8, in step S10, the method provides a ramp signal. In step S12, the method provides a normal operation control signal according to the ramp signal and a control signal. In fact, the control signal is related to an output voltage of the power converter and a reference voltage. For example, the control signal can be generated according to the reference voltage and the output voltage from the voltage output terminal of the power converter, but not limited to this. In addition, the method can also compensate the control signal.

In step S14, the method determines whether the control signal is higher than a threshold of the ramp signal. If the determining result of step S14 is yes, the method will perform step S16 to provide a dynamic response control signal. Then, the method will perform step S18 to adjust a duty cycle of a PWM signal according to the dynamic response control signal. The PWM signal is generated according to the normal operation control signal or the dynamic response control signal. Then, the plurality of input terminals of the plurality of phase channels in the multiple channel will receive the output voltage from the voltage input terminal and receive a PWM signal from the power converter respectively, and the plurality of output terminals of the plurality of phase channels in the multiple channel will output the output signal to the voltage output terminal.

Figure 9A:
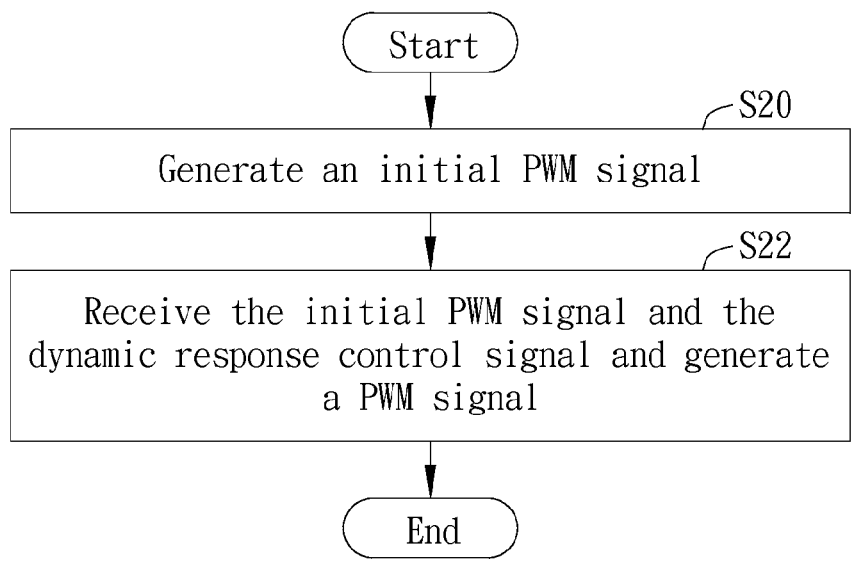
FIG. 9A and FIG. 9B illustrate a flowchart of the operating method generating the PWM signal when the power converter is a single-phase DC-DC converter or a multi-phase DC-DC converter respectively.

In practical applications, the PWM signal generating step of the method will be different based on whether the power converter is a single-phase DC-DC converter or a multi-phase DC-Dc converter, described as follows:

As shown in FIG. 9A, if the power converter is the single-phase DC-DC converter, the method will perform step S20 to generate an initial PWM signal. In fact, a duty cycle of the initial PWM signal will be dynamically varied with the output loading of the power converter, but not limited to this. Then, the method will perform step S22 to receive the initial PWM signal and the dynamic response control signal and generate a PWM signal. It should be noticed that the dynamic response control signal in step S22 is the dynamic response control signal provided in step S16.

Figure 9B:
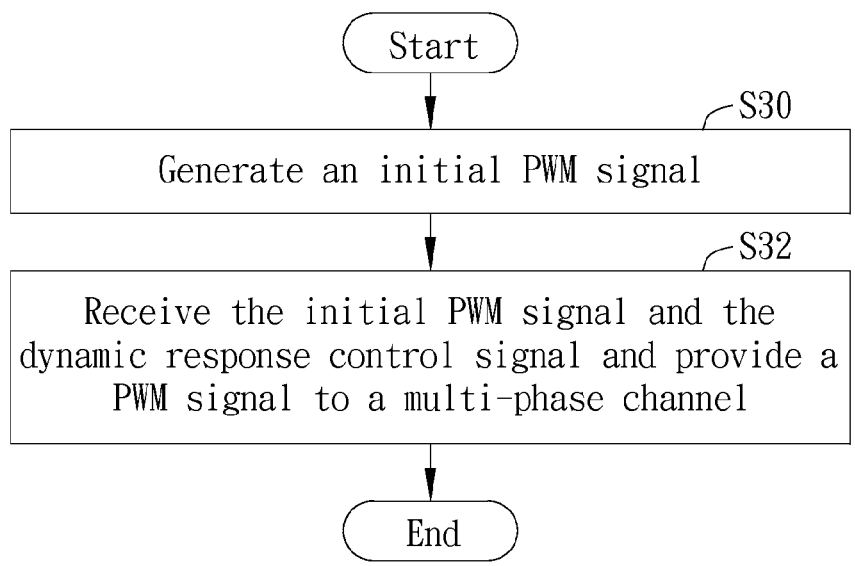

As shown in FIG. 9B, if the power converter is the multi-phase DC-DC converter, the method will perform step S30 to generate an initial PWM signal. In fact, a duty cycle of the initial PWM signal will be dynamically varied with the output loading of the power converter, but not limited to this. Then, the method will perform step S32 to receive the initial PWM signal and the dynamic response control signal and provide a PWM signal to a multi-phase channel. Wherein, the duty cycle of the initial PWM signal of each phase will be dynamically varied with the initial PWM signal and the dynamic response control signal.

Compared to the prior arts, the power converter and operating method thereof disclosed in the invention can determine the change of the pulse modulation width and take appropriate response measure according different output voltages without additional pins and specific detection circuit; therefore, it can have advantages of real-time dynamic response, reducing area and cost of IC. In addition, the simple circuit used in the power converter of the invention can enhance the reliability of IC and the error detection and correction, and it can have higher versatility to be applied to all single-phase converters and multi-phase converters.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A power converter, comprising:
   a ramp generating unit, for providing a ramp signal;
   a first comparator, coupled to the ramp generating unit and receiving the ramp signal and a control signal to provide a normal operation control signal, wherein the control signal is related to an output voltage of the power converter and a reference voltage;
   a second comparator, coupled to the ramp generating unit and receiving the ramp signal and the control signal to provide a dynamic response control signal; and
   a pulse width modulation (PWM) signal generating unit, coupled to the first comparator and the second comparator and generating a PWM signal according to the normal operation control signal or the dynamic response control signal;
   wherein when the magnitude of the control signal is higher than a threshold of the ramp signal, the second comparator provides the dynamic response control signal to the PWM signal generating unit to control the PWM signal generating unit to adjust a duty cycle of the PWM signal.

2. The power converter of claim 1, wherein the PWM signal generating unit comprises a PWM signal generator, the PWM signal generator is coupled to the first comparator and used for generating an initial PWM signal, and a duty cycle of the initial PWM signal is dynamically changed with an output load of the power converter.

3. The power converter of claim 1, further comprising an error amplifier and a compensating unit, the error amplifier is used for providing the control signal, and the compensating unit is coupled to an output terminal of the error amplifier.

4. The power converter of claim 1, wherein when the power converter is a single-phase DC-DC converter, the PWM signal generating unit comprises a logic unit and a PWM signal generator, the PWM signal generator is used for generating an initial PWM signal, and the logic unit receives the initial PWM signal and the dynamic response control signal and generates the PWM signal.

5. The power converter of claim 1, wherein if the power converter is a multi-phase DC-DC converter, the PWM signal generating unit comprises a PWM signal generator and a phase channel selection unit, the PWM signal generator is used for generating an initial PWM signal, and the phase channel selection unit receives the initial PWM signal and the dynamic response control signal and provides the PWM signal to a multi-phase channel, wherein a duty cycle of the PWM signal of each phase is dynamically changed with the initial PWM signal and the dynamic response control signal.

6. An operating method for a power converter, the operating method comprising steps of:
   (a) providing a ramp signal;
   (b) providing a normal operation control signal according to the ramp signal and a control signal, wherein the control signal is related to an output voltage of the power converter and a reference voltage;
   (c) determining whether the magnitude of the control signal is higher than a threshold of the ramp signal;
   (d) if the determining result of step (c) is yes, providing a dynamic response control signal; and
   (e) adjusting a duty cycle of a pulse width modulation (PWM) signal according to the dynamic response control signal, wherein the PWM signal is generated according to the normal operation control signal or the dynamic response control signal.

7. The operating method of claim 6, further comprising the step of:
   generating an initial PWM signal, and a duty cycle of the initial PWM signal is dynamically changed with an output load of the power converter.

8. The operating method of claim 6, further comprising the step of:
   generating the control signal according to the output voltage of the power converter and the reference voltage; and
   compensating the control signal.

9. The operating method of claim 6, wherein if the power converter is a single-phase DC-DC converter, the method further comprises the steps of:
   generating an initial PWM signal; and
   receiving the initial PWM signal and the dynamic response control signal and generating the PWM signal.

10. The operating method of claim 6, wherein if the power converter is a multi-phase DC-DC converter, the method further comprises the steps of:
    generating an initial PWM signal; and
    receiving the initial PWM signal and the dynamic response control signal and providing the PWM signal to a multi-phase channel;
    wherein a duty cycle of the PWM signal of each phase is dynamically changed with the initial PWM signal and the dynamic response control signal.

11. The power converter of claim 1, wherein if the power converter is a multi-phase DC-DC converter, the PWM signal generating unit provides the PWM signal to a multi-phase channel having a plurality of phase channels, when the PWM signal generating unit receives the dynamic response control signal, a duty cycle of the PWM signal in a first phase channel of the multi-phase channel is the same with that in other phase channels of the multi-phase channel, so the power converter can provide enough energy to an output load of the power converter.

12. A power converter, comprising:
    a ramp generating unit, for providing a ramp signal;
    a first comparator, coupled to the ramp generating unit and receiving the ramp signal and a control signal to provide a normal operation control signal;
    a second comparator, coupled to the ramp generating unit and receiving the ramp signal and the control signal to provide a dynamic response control signal; and
    a pulse width modulation (PWM) signal generating unit, coupled to the first comparator and the second comparator and generating a PWM signal according to the normal operation control signal or the dynamic response control signal.

13. The power converter of claim 12, wherein when the magnitude of the control signal is higher than a threshold of the ramp signal, the second comparator provides the dynamic response control signal to the PWM signal generating unit to control the PWM signal generating unit to adjust a duty cycle of the PWM signal.

* * * * *